Feb. 8, 1927. 1,616,877
H. SMITH
SIGNALING MECHANISM
Filed July 8, 1921 3 Sheets-Sheet 2

INVENTOR
Harry Smith
BY
C. E. Beach
ATTORNEY

Feb. 8, 1927.
H. SMITH
1,616,877
SIGNALING MECHANISM
Filed July 8, 1921
3 Sheets-Sheet 3
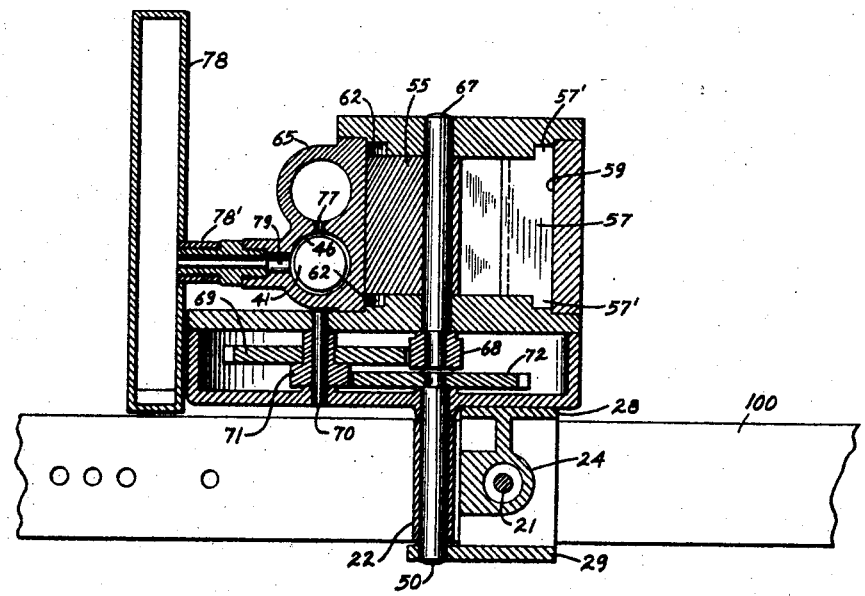
Fig.6
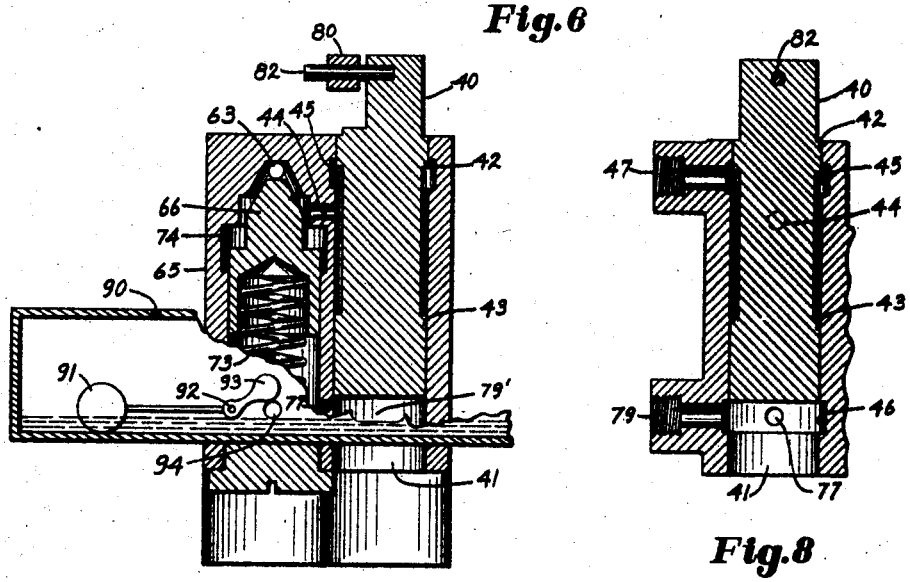
Fig.7
Fig.8
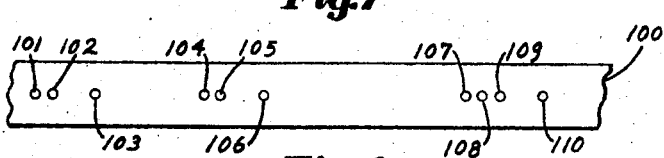
Fig.9
INVENTOR
Harry Smith
BY
*C.E. Beach*
ATTORNEY Patented Feb. 8, 1927.

1,616,877

UNITED STATES PATENT OFFICE.

HARRY SMITH, OF NEEDHAM, MASSACHUSETTS, ASSIGNOR, BY MESNE ASSIGNMENTS, TO THE GAMEWELL COMPANY, OF NEWTON, MASSACHUSETTS, A CORPORATION OF MASSACHUSETTS.

SIGNALING MECHANISM.

Application filed July 8, 1921. Serial No. 483,219.

This invention relates to signaling mechanism, and is particularly adapted for embodiment in mechanism responsive to a source of signaling impulse cycles and comprising two instrumentalities one of which quickly accomplishes a predetermined function in response to each such cycle (as, for example, the marking device of a signal recorder), and the other of which is conditioned incident to each such cycle to act for a predetermined period thereafter (as, for example, the paper feeding train of such a recorder).

Signaling mechanisms have heretofore been devised embodying two such instrumentalities each responsive, either directly or indirectly, to comparatively feeble signaling impulses (such as, for example, current flow changes in a telegraphic circuit), and each of which instrumentalities has been operable by stored energy (such as, for example, that of a spring under tension or that of an elevated weight). Such prior mechanisms have comprised complicated structures for the purpose of suitably applying such stored energy to the intended instrumentalities, and for enabling such energy to be reliably controlled by parts operable in response to manifestations of comparatively feeble signaling impulses (as, for example, the varying pull of an electromagnet the windings of which are traversed by an electric current of comparatively small intensity, such as is employed in the main line circuits of ordinary fire alarm telegraph systems). Such prior mechanisms have further been subject to operating failures because of lack of timely replacement of operating energy incident to the exhaustion of the sources of stored energy provided therefor. The hazard of lost signals incident to lack of timely replacement of stored energy is a serious one; particularly at a location where a plurality of such mechanisms is employed, individual ones of which need such replacement at irregular intervals entirely irrespective of the needs of others thereof.

One of such two instrumentalities has heretofore been arranged to initiate a predetermined cycle of action in response to each complete signaling impulse and to complete such cycle before the timely occurrence of any succeeding signaling impulse. Instances of such one of said instrumentalities found in fire alarm apparatus may be exemplified as follows: in a tape register—the marking means, in a dial indicator—the dial actuating means, and in an automatic repeater—the multiple circuit repeating contacts. For lack of a better designation, such an instrumentality will be hereinafter referred to as "a signal impulse accentuator".

The other one of such two instrumentalities embodied in such prior mechanisms has heretofore been arranged to be conditioned, incident to response of such accentuators to each signaling impulse, to act for a predetermined interval thereafter; such action usually taking the form of the running of a train of clockwork for an interval measured thereby. Instances of such other one of said instrumentalities found in ordinary fire alarm apparatus may be exemplified as follows: in a tape register—the mechanism which, in addition to propelling the paper tape past the marking device at such speed that the representations of impulses of intended code signals will be so spaced on the tape as to graphically indicate the time intervals which elapse between such impulses, determines the duration of the interval throughout which such propulsion should continue following any signaling impulse; in a dial indicator—the shifting train which, in addition to serving to transfer the operative relationship of the actuating means from one dial to another, determines the duration of the interval following any signaling impulse which must elapse before operative relationship should be transferred from one dial to another or suspended following transfer from the last dial of a series; and in an automatic repeater—the locking mechanism and associated time train which, in addition to serving upon the initial impulse of each signal to lock non-controlling initiating circuits, determines the interval following any signaling impulse which must elapse before such non-controlling circuits should be unlocked. For lack of a better designation, such an instrumentality will be hereinafter referred to as "an interval determinant".

The extent of the hazard of lost signals incident to lack of timely replacement of stored energy at a location where a plurality of prior art signaling mechanisms are employed, is well illustrated by the example of a typical manually operated central office equipment for a municipal fire alarm system having, say, 50 box or incoming alarm circuits, together with, say, 15 primary and 15 secondary outgoing alarm circuits. In such an office it is essential that independently operable signal recording facilities be provided for each of the incoming circuits, and it is highly important that corresponding facilities be provided for each of the outgoing circuits and that automatic time and date stamp facilities be associated with the recorders.

Thus, a failure to keep any one of the 50 incoming circuit registers properly wound is likely to result in the loss or improper retransmission of alarms from some 20 fire alarm street boxes, thereby delaying the arrival of the firemen to an extent such as frequently involves death to those whom the firemen could otherwise have rescued, and such as permits a small readily controlled fire to assume disastrous proportions. Likewise, a failure to keep properly wound any one of the 50 time stamps associated with such registers may result in the loss of a time record such as is sometimes so valuable in recovering insurance on burned property. Similarly, a failure to keep properly wound any one of the 30 registers or the 30 time stamps for the outgoing alarm circuits may prevent timely discovery of failures to transmit or incorrect transmission of signals from the central office to one or more groups of some six or more fire houses, with correspondingly disastrous results. In addition to the registers or recording devices and the time stamps, failure to give timely attention to the rewinding of such instruments as manual transmitters, speed transformers, automatic repeaters and the like, is apt to lead to equally disastrous results, and the number of winding places requiring attention in such an office will—including the last named instruments—frequently exceed a total of 175.

The need of keeping all of so large a number of winding places properly attended to in such a fire alarm office involves a further hazard which arises from the fact that under conditions of unusual fire department activity (as when there are concurrent fires or an approach to or realization of conflagration conditions) the operators in such fire alarm offices—although acting under circumstances tending to impair calm judgment—must decide from moment to moment whether it is more important to give their attention to rewinding run down instruments, with a view of avoiding loss or mutilation of alarms, such as might have appalling results at such a time, or give their attention to the handling of an almost unbroken stream of calls for more help, ambulances, fuel wagons and other like matters, delay in handling which may be so disastrous under the then existing circumstances.

In order to provide convenient access to each winding place and to provide space for what is believed to be a reasonable storage of energy, the prior art instruments of such fire alarm offices have, of necessity, been installed in such space relativity, and have been of such size as to preclude compact grouping of instruments in a manner conducive to best operating results. For example,—in a fire alarm central office such as that hereinbefore just referred to in detail, it has been impracticable to so group the registers of incoming and outgoing circuits as to render them available for comparison by the operator of the retransmission device or so-called "manual transmitter" other than by traveling backwards and forwards over distances so great as to introduce a serious element of danger of error as well as an appreciable operative delay.

Such failure to display records of incoming alarms where they may be used by the operator for quickly and accurately checking his work while setting his manual transmitter and just before starting thereof for retransmission of the alarm, introduces an element of danger the seriousness of which can be best appreciated when it is remembered that an error of a stroke or two or a transposition of numerals (as, for example, sending the fire companies the alarm 794 when 497 is intended) will frequently cause fire companies which can most quickly reach the scene of the actual fire to go to a location where their services are not needed, thereby making it necessary to call other companies when the error is discovered. Such an occurrence involves both the delay incident to the discovery of the error and retransmission of the alarm and a further delay incurred because companies eventually given the correct alarm are compelled to traverse a much greater distance than would have been necessary for those who would have responded to the alarm had it not been for the error. It will also assist in realization of the seriousness of such delays to remember that fire departments now count delays of seconds and fractions of a second as potential factors in determination of questions of success in rescuing people from burning buildings and of preventing small fires from assuming serious proportions.

An object of this invention is to provide such signaling mechanism which is more compact, more simple, more inexpensive to manufacture and more durable than mechanisms heretofore provided for similar purposes.

Another object is to provide such a mechanism which does not require rewinding of driving means, such as the springs or weights heretofore employed for the actuation of such mechanisms.

Another object is to provide mechanism of the character described which may be operated continuously throughout comparatively long periods without manual attention and without alteration of the speed of operation such as results from the unwinding of a motor spring.

Another object is to provide mechanism of the character described, a plurality of units of which may be independently driven from a source of energy common to all of such units.

Another object is to provide mechanism of the character described, the control of which may be accomplished by the expenditure of less energy than that needful for mechanisms heretofore devised for similar purposes.

Still other objects and the inherent advantages thereof will be in part obvious and in part hereinafter specifically described and more particularly pointed out in the claims.

In order to facilitate comprehension of this invention, an illustrative embodiment thereof is shown in the accompanying drawing and hereinafter specifically described; but this invention is not limited to the embodiment shown and so described, as this invention is well adapted to other embodiments thereof.

Like reference characters denote the same parts throughout the accompanying drawing, in which—

Fig. 6 is a sectional view of the device of Figs. 1 and 2 taken along the line 6—6 of Fig. 1;

Fig. 7 is a sectional view of an alternative construction to be referred to;

Fig. 8 is a front sectional elevation of the valve member 40 and its casing; and Fig. 9 is a fragmentary representation of a paper tape with characteristic punch marks.

Figure 1:
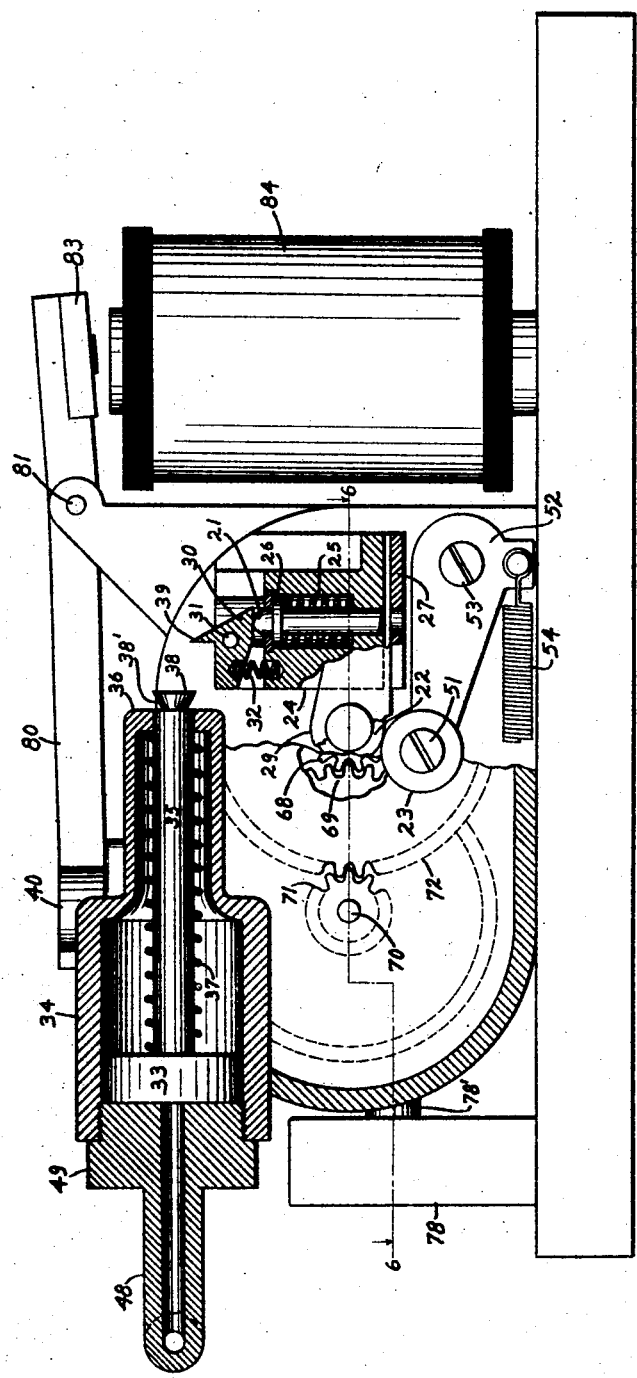
Figure 1 is a front elevation of a tape register embodying this invention, with certain parts removed and with portions of the enclosing walls broken away and shown in section.
Figure 2:
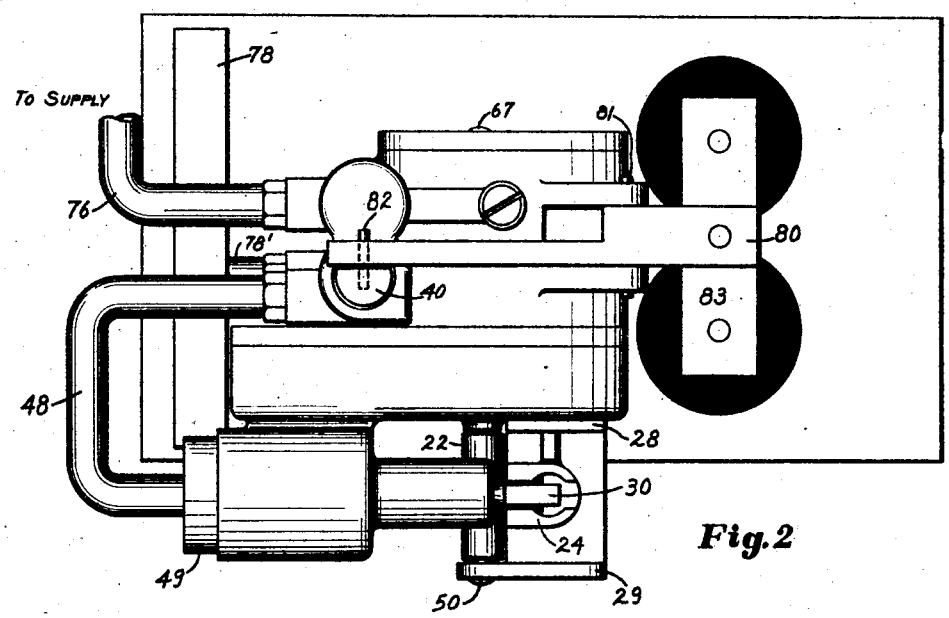
Fig. 2 is a plan view of the register of Fig. 1.

Referring to the signal recorder of Figs. 1 and 2; signal impulse accentuator mechanism, typified by the punch 21, is provided for suitably marking such paper tape as may be propelled past the lower end thereof by the tensioned feed rollers 22 and 23; which rollers, together with the driving mechanism therefor, constitute an interval determinant for disclosing the relative lengths of the intervals which elapse between actuations of the punch 21 incident to the production thereby of a record of a signal.

The punch 21 is supported in a suitable opening in the block 24 for free movement lengthwise thereof, the spring 25 (see Fig. 1) surrounding said punch and being contained in an enlarged portion of such opening. An annular flange 26 carried by the punch 21 is situated directly above the spring 25 so as to receive the upward thrust of said spring and thereby normally maintain the lower end of said punch slightly above the lower face of the block 24. A die plate 27 (see Fig. 1) is mounted slightly below the block 24 so that a suitable space will be provided between the lower face of said block and the upper face of said plate for the passage of paper tape therebetween. The flanges 28 and 29 are provided at opposite sides of the plate 27 for suitably guiding paper tape when propelled across the face of said plate by the rollers 22 and 23. A suitable opening (Fig. 1) is provided through the plate 27 for receiving the lower end of the punch 21 and for permitting punchings cut out of paper tape by said punch to pass through said plate.

A dog 30 is journaled on the pivot 31 in such relation to the upper end of the punch 21 that clockwise rotation of said dog will cause said punch to be moved downwardly far enough to properly cut a disc from such paper tape as may be presented to the lower end of said punch.

The dog 30 is so formed and mounted as to be adapted to swing away from engaging relation with the punch 21 for a purpose which will be hereinafter more fully explained.

A spring 32 is so applied to the dog 30 as to tend to swing same toward the punch 21 and thereby maintain engagement therebetween; said spring 32 being of such strength as to be readily overcome by the upward thrust of the spring 25 acting through the punch 21 and the portion of the dog 30 engaging therewith.

A piston 33 is mounted in the cylinder 34, and said piston is secured to one end of the piston rod 35, and the other end 38 of said rod projects from the end 36 of the cylinder 34. The spring 37 surrounds the rod 35 and extends from the inner face of the cylinder end 36 to the piston 33, and constantly urges said piston away from said end 36. The cylinder 34 and the projecting end 38 of the rod 35 are so positioned and arranged that movement of the piston 33 toward the end 36 of the cylinder 34 will cause the end 38 to engage the ear 39 of the dog 30 and thereby to swing said dog around the pivot 31 so as to drive the punch 21 downwardly a suitable distance and thereupon permit said end 38 to pass to the right of the ear 39. The relative formation of the end 38 and ear 39 is such that when the enlarged portion of the end 38 has passed to the right of said ear, the spring 25 will be permitted to drive the punch 21 upwardly to its normal position, and thereby swing the ear 39 into the path of the enlarged portion of said end 38, and so that the spring 37 may thereupon move the piston 33 so as to carry the end 38 to its normal position at the left of the ear 39—incidentally swinging the dog 30 in counterclockwise direction and thereupon disengaging said ear 39.

A balanced valve is provided for governing the operation of the recorder, which valve comprises the movable member 40 (see Fig. 4) which is mounted for lengthwise movement in an opening 41 provided therefor in the body of the recorder.

The member 40 carries the annular flanges 42 and 43 which snugly fit the general diameter of the opening 41, and which flanges are situated at opposite sides of the fluid supply port 44, so that said valve member is suitably balanced with relation to fluid pressure applied thereto from said port.

An annular groove 45 is formed in the wall of the opening 41 somewhat above the port 44, and forms a valve port cooperating with the flange 42 and opening into the outlet 47; said groove 45 being somewhat narrower than the face of the flange 42, so that said flange will always engage the wall of the opening 41 at one side or the other of said groove. The relative formation of the portion of the opening 41 above the groove 45 and the portion of the member 40 above the flange 42 is such as to provide an orifice through which fluid may escape to the outer air from said groove when the upper side of the flange 42 is positioned below the upper wall of said groove 45.

A second annular groove 46 is formed in the lower part of the wall of the opening 41 in such relation to the flanges 42 and 43 and the groove 45 that while said flange 42 is so positioned that the upper side thereof is situated a suitable distance below the upper wall of the groove 45 so as to permit the escape of fluid therefrom, the lower side of the flange 43 will be situated below the lower wall of the groove 46 so as to prevent the escape of fluid from said groove downwardly through the opening 41, and so that, whenever the lower side of the flange 42 is situated a suitable distance above the lower wall of the groove 45 so as to permit the admission of fluid from the port 44 into said groove, the lower side of the flange 43 will be positioned a suitable distance above the lower wall of the groove 46, so as to permit the escape of fluid therefrom through the lower end of the opening 41.

One end of the duct 48 is secured in the outlet 47 and the other end of said duct carries the plug 49 which is secured in the cylinder 34 in such relation to the piston 33 that when fluid is introduced into said cylinder through said duct the piston 33 will be moved toward the end 36 of said cylinder and so that when fluid is permitted to escape from said cylinder through said duct the spring 37 may move the piston 33 away from the end 36 of said cylinder.

The controlling lever 80 is pivoted at 81 and carries the pin 82 which engages a recess in the upwardly projecting end of the valve member 40 for imparting suitable movement thereto. The other end of the lever 80 carries the armature 83 in suitable relation to the electromagnet 84; so that, when said armature is moved into engagement with said magnet, said member 40 will be so elevated as to place the groove 46 in communication with the atmosphere through the lower end of the opening 41, and so that the groove 45 will be cut off from communication with the atmosphere through the upper end of said opening 41 and said groove will be placed in communication with the duct 44.

The feed roller 22 is carried by the driving shaft 50 which is journaled in the frame of the recorder as shown, and the feed roller 23 is journaled upon the stud 51, which stud is carried by the arm 52. The arm 52 is pivoted at 53, and the spring 54 is so applied to said arm as to cause same to hold the roller 23 in suitable engagement with the roller 22.

The shaft 50 is driven by a fluid pressure operable motor comprising the slotted hub 55 and the vanes 56, 57 and 58 which are mounted in the slots provided in said hub. The hub 55 is fixed upon the shaft 67 which is journaled in the frame of the recorder, and said shaft drives the pinion 68, which pinion is shown in Fig. 1 through an opening broken through the gear 72. The reduction gear 69 is fixed upon the shaft 70 in such position as to mesh with the pinion 68. The pinion 71 is driven by the shaft 70; and the gear 72 is fixed upon the shaft 50 in position to be engaged by said pinion 71. A substantial reduction in speed is thus provided between the hub 55 and shaft 67, and the shaft 50 and roller 22. The hub 55 and the vanes 56, 57 and 58 are mounted in the eccentric cylinder 59 formed in the frame of the recorder, a jet opening 60 being provided in the upper portion of the cylinder 59 and an escape or exhaust opening 61 being provided in the lower portion of said cylinder.

Figure 3:
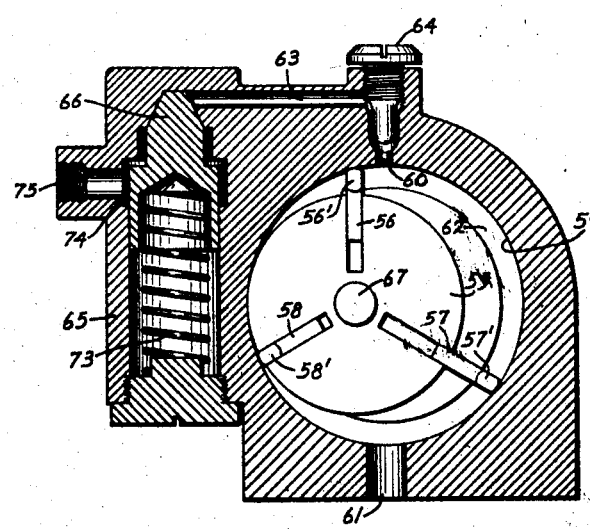
Fig. 3 is an elevation in section of the motor mechanism of the register of Figs. 1 and 2, together with the controlling devices therefor.

Grooves, such as the groove 62 shown in Fig. 3, are formed in the ends of the cylinder 59 so as to receive the lugs 56', 57' and 58', carried by the vanes 56, 57 and 58 respectively, for operating said vanes in a well known manner so that the application of fluid pressure through the opening 60 will cause clockwise rotation of the hub 55 and shaft 67 in a well known manner.

One end of the duct 63 communicates fluid to the opening 60, the adjusting screw 64 being provided at the junction between said duct 63 and said opening 60 for the purpose of suitably restricting the passage of fluid therebetween so as to afford desired regulation of the speed of rotation of the shaft 50.

Figure 5:
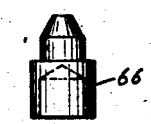
Fig. 5 is a view of one of the parts shown by Figs. 3 and 4.

The other end of the duct 63 forms a port in the barrel 65 of a retarded valve comprising the plunger 66. The upper end of the plunger 66 is so formed (see also Fig. 5) that when said plunger is in fully elevated position it will close the port formed by an end of the duct 63.

A spring 73 is provided in the lower portion of the barrel 65, and said spring is so applied to the plunger 66 as to constantly urge same toward the fully elevated position thereof.

An annular groove 74, formed in the upper part of the barrel 65, communicates with a connection for a source of fluid pressure supply comprising the threaded opening 75 (see Fig. 3) and the duct 76 secured therein (see Fig. 2).

The relative construction of the plunger 66 and the barrel 65 is such as to provide a restricted passage for the flow of fluid from one end to the other of said plunger.

An outlet or port 77 connects the lower portion of the barrel 65 with the groove 46, which groove is formed in the opening 41 so that fluid entering the opening 75 may pass around the plunger 66 and through the outlet 77 into said groove 46.

The port 44 provided in the wall of the opening 41 communicates with the upper portion of the barrel 65 and is therefore at all times subject to fluid supply from the opening 75 (through the groove 74 and the clearance between the plunger 66 and walls of the barrel 65).

A compression chamber or receptacle 78 is connected through the tube 78' with the opening 79, which opening communicates with the groove 46 formed in the lower portion of the wall of the opening 41. It is therefore evident that the interior of the chamber 78 is at all times in communication with the supply source opening 75 through the barrel 65, the outlet 77, the groove 46, the opening 79 and the tube 78'. If the fluid to be supplied through the duct 76 is of readily compressible character (as, for example, air) the capacity of the chamber 78 added to that of the tube 78', the opening 79, the groove 46, the outlet 77 and the portion of the barrel 65 which is below the plunger 66 should be such that, when the fluid content thereof is at atmospheric pressure, the time required for the flow of fluid through the restricted passage between the plunger 66 and the barrel 65 in sufficient volume to so raise the pressure below the plunger 66 as to enable the spring 73 to lift said plunger to its fully elevated position will be longer than the longest interval between the succeeding impulses of any signal to which it is intended that the recorder shown should respond; to the end that the rotation of the rollers 22 and 23 will be continuous throughout all intervals between the impulses of any signal formulated in such circuit as may be connected to the windings of the magnet 84.

In applying this invention to signaling mechanism operable by a non-compressible fluid (such as, for example, water) it is evident that other arrangements should be provided for the timing of the running of the driving motor for the paper feed rolls. For example,—the chamber 78 may be filled with a compressible fluid, such as air, and such fluid may be alternately compressed and released by the action of the non-compressible fluid in entering and leaving said chamber; or, as indicated by Fig. 7, the upper portion of said chamber may be vented to the atmosphere, as by means of the opening 90, and a float 91, pivoted at 92 and operatively connected with the gate valve member 93, may be provided therein for preventing the entrance of more than a predetermined amount of fluid from the opening 94, while the ready escape of fluid from said chamber can at all times be effected through the elongated opening 79' by movement of the member 40. Thus, when the float 91 is positioned as shown, water pressure applied to the upper surface of the plunger 66 will move same against the tendency of the spring 73 and, when the valve member 40 is restored to its normal position, the water which passes between said plunger 66 and the wall of the barrel 65 will enter the float chamber through the opening 94 and thereby gradually increase the level of the water within said chamber until the float 91 has been raised to a point where the valve member 93 so nearly closes the opening 94 that the pressure of the water below the plunger 66 will so closely approximate that above said plunger that the spring 73 will move said plunger to the position where the upper end thereof covers the end of the duct 63, and thereby terminates the supply of water through said duct to the motor mechanism operable thereby. Thereafter, if the valve member 40 is raised so as to permit the escape of water through the opening 79', the water level in the float chamber will be so lowered that the float 91 will drop far enough to move the valve member 93 away from the opening 94 and thereby again unbalance the plunger 66.

In the recorder shown provision is made for normal deenergization of the electromagnet 84, but it will be understood by those skilled in this art that by suitable alteration of the relative arrangement of the armature 83, lever 80, pivot 81, valve member 40 and opening 41 said recorder may be readily arranged for normal energization of the magnet 84.

Under normal conditions the action of gravity upon the valve member 40 and the portion of the lever 80 extending to the left of the pivot 81 (as viewed in Figs. 1 and 2) serve to support the armature 83 in retracted position and to maintain the valve member in its normal position as shown. The action of gravity upon such parts may be supplemented, if desired, by a suitable retractile spring.

When the recorder shown is conditioned for operation, a source of fluid pressure supply (as, for example, compressed air) is connected with the duct 76, the valve member 40 and plunger 66 are normally positioned as shown; the chamber 78, the portion of the opening 41 between the flanges 42 and 43 and the barrel 65 are at the pressure of such supply source and the cylinder 34 and cylinder 59 are at atmospheric pressure.

Figure 4:
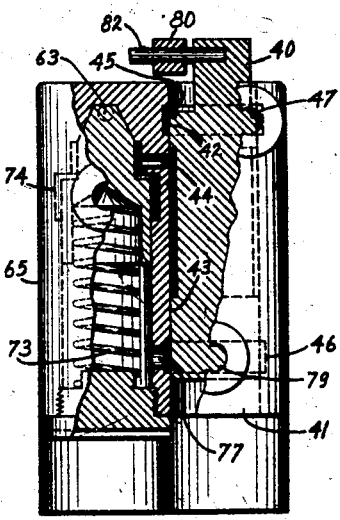
Fig. 4 is an end elevation of certain parts of the structure of Figs. 1 and 3, with portions of the enclosing walls broken away to disclose the interior arrangement thereof.

The operation of the recorder shown is as follows:

When the parts are conditioned for operation, as just described, if the magnet 84 is effectively energized, the armature 83 will move into engagement therewith and thereby swing the lever 80 around the pivot 81 far enough so that the pin 82 carried by said lever will lift the valve member 40 from the position shown in Fig. 4 so as to carry the upper side of the flange 42 above the upper wall of the groove 45 and so as to carry the lower side of said flange above the lower wall of said groove. Fluid from the supply opening 75 will thereupon be admitted through the port 44, the portion of the opening 41 between the flanges 42 and 43, the groove 45, the outlet 47, the duct 48, and the plug 49, into the cylinder 34. The fluid entering the cylinder 34, as just described, will move the piston 33 in said cylinder toward the end 36 thereof, and will thereby cause the end 38 of the rod 35 to engage the ear 39 and thereby swing the dog 30 around its pivot 31 so as to force the punch 21 downwardly. When the punch 21 has been moved downwardly a suitable distance, as just described, the end 38 of the rod 35 will pass over the ear 39 and the spring 25 will thereupon restore the punch 21 and the dog 30 to their normal positions, as shown by Fig. 1; the ear 39 thereupon being disposed in the groove 38' formed in the rod 35 near the end 38 thereof.

When the valve member 40 is lifted by the pull of the magnet 84, as hereinbefore more fully explained, the lower end of said member will be raised above the lower wall of the groove 46, and will thereby permit the escape of fluid through the lower end of the opening 41, both from the chamber 78 and from the lower portion of the barrel 65. The escape of fluid from the chamber 78 will thus quickly bring the contents of said chamber to atmospheric pressure, and the escape of fluid from the lower portion of the barrel 65 will immediately unbalance the pressures applied to the respective ends of the plunger 66 and said plunger will thereupon move downwardly so as to uncover the port formed by an end of the duct 63 and thereby start the driving motor for the paper feed rollers, as hereinbefore more fully described.

When the various parts have acted in response to energization of the electromagnet, as just described, upon the subsequent deenergization of said magnet the valve member 40 will move downwardly and thereby cut off fluid communication between the supply opening 75 and the cylinder 34, and will connect the interior of said cylinder with the atmosphere through the upper portion of the opening 41. When the cylinder 34 is connected with the atmosphere, as just described, the spring 37 will act through the piston 33 to expel fluid from said chamber and to restore said piston to its normal position. When the piston 33 is restored to its normal position, as just described, the end 38 of the rod 35 moving with said piston will so engage the ear 39 of the dog 30 as to swing said dog against the tension of the spring 32 far enough to permit said end 38 to pass over said ear. Said end 38 will thereupon be withdrawn from the path of said ear 39 and the spring 32 will then swing the dog 30 around the pivot 31 so as to bring the ear 39 into the path of the end 38.

When the valve member 40 moves downwardly, incident to the deenergization of the magnet 84 as just described, the flange 43 of said member will prevent the further escape of fluid from the outlet 77 and the opening 79 through the opening 41; and the fluid thereafter flowing through the restricted passage provided between the plunger 66 and the barrel 65 will gradually increase the pressure in the chamber 78 and the fluid path connected therewith so that, if the magnet 84 is not again energized for a period longer than the longest interval between energizations thereof incident to any signal for the manifestitation of which the recorder is intended, the pressure in the lower portion of the barrel 65 will then be sufficiently raised to permit the spring 73 to move said plunger upwardly and thereby arrest the running of the driving motor for the paper feed rollers.

Should the magnet 84 be subjected to further energization before the running of the driving motor has been arrested, as just described, the punch 21 will be correspondingly driven downwardly in response to each such impulse, and the fluid in the chamber 78 and fluid path connected therewith will be reduced to atmospheric pressure incident to each energization of said magnet. It is therefore evident that if paper tape such as the tape 100 has been inserted between the rollers 22 and 23 such tape will be propelled at a uniform speed (as determined by the adjustment of the screw 64) and perforations will be made in said tape incident to each actuation of the punch 21; the spaces between succeeding perforations made being, in every instance, proportionate to the intervals of time which elapse between the energizations of the magnet 84 represented by such perforations, so long as such intervals are no longer than the longest interval between energizations thereof incident to any signal for the manifestation of which the recorder is intended. After the conclusion of any such signal, the magnet 84 will remain deenergized longer than the longest interval between the impulses of any signal, and after the conclusion of such period the driving motor for the feed roller will be brought to rest.

A tape record produced as just indicated is shown in Fig. 9. In the production of this record, the tape 100, as shown, moved from right to left, and the signal is therefore readable from left to right. It will be noted that the fragment of tape illustrated shows two rounds of a signal from station 21 and one round of a signal from station 31; the intervals which elapsed between the different signaling impulses being graphically portrayed so as to facilitate correct interpretation of these signals.

It will be observed that the interval between signaling impulses within the digit (the intra-digit intervals) are represented by the small spaces provided between marks 101 and 102, 104 and 105, 107 and 108, and 108 and 109. The interval between the last stroke of one digit and the first stroke of the next succeeding digit (the inter-digit interval) is represented by the greater spaces between marks 102 and 103, 105 and 106, and 109 and 110. The interval between the last stroke of one round and the first stroke of the next succeeding round of a signal (the inter-round interval) is represented by the space between mark 103 and mark 104. It will be noted that the length of the inter-digit interval so exceeds that of the intra-digit interval that, in the signal as recorded, the contrast between the durations of these intervals is very clearly apparent, so that there should be no occasion for mistaking tape record representations of one of these intervals for the other, even when a tape record is hastily consulted.

For like reasons, the inter-round interval correspondingly exceeds the inter-digit interval, and the space between the last stroke of one signal and the first stroke of another signal subsequently recorded should correspondingly exceed the space between any two marks within a signal; thus, as exemplified in Fig. 9, the space between marks 106 and 107 so exceeds the spaces between any other two immediately consecutive marks. Because of the peculiar construction and arrangement of the signaling device hereinbefore described in detail, the space between the last mark of each signal and the first mark of a subsequently formulated signal will be correspondingly distinguished from the longest interval between the impulses of any such signals.

It will also be understood that the speed at which the tape is propelled, as determined by the adjustment of the screw 64, should be such that the spaces between the marks comprising any digit of a signal—and hence representative of the intra-digit intervals—will be such as to facilitate counting such marks; and the capacity of the chamber 78 should be so adjusted that the length of the space which will intervene between the last stroke of one signal and the first stroke of the next succeeding signal will sufficiently exceed the longest space between the intervals within any signal for the manifestation of which the device is intended, so as to make clearly and instantly apparent the difference between intra- and inter-signal intervals, by showing the latter as much longer than any of the former.

Although the construction and arrangement of the recorder shown and hereinbefore described are features of my invention, in a narrower aspect thereof, in a broader sense,— such features are merely illustrative, and it should be understood that the broad features of this invention are suitable for application to various types of signal recorders and to other signal mechanism, and that the various parts may be readily altered, added, omitted, or changed by those skilled in this art, in the light of the foregoing disclosure, so as to suit various operating conditions, without departing from the spirit of this invention.

What I claim and desire to secure by Letters Patent of the United States of America is:

1. In a signal device, in combination, an impulse accentuator and an interval determinant, involving driving means therefor operable from a source of fluid pressure, and fluid controlling means for effecting functional interdependence between said accentuator and said determinant.

2. In a signal device, in combination, an impulse accentuator and an interval determinant each involving driving means therefor operable from a source of fluid pressure, and fluid controlling means for said driving means comprising means for causing actuation of the driving means for said determinant for a predetermined period following actuation of said accentuator.

3. In a signal device, in combination, an impulse accentuator and an interval determinant each involving driving means therefor operable from a source of fluid pressure, and fluid controlling means operable to cause functional actuation of the driving means for said accentuator and to be conditioned to cause functional actuation of the driving means for said determinant for a predetermined period thereafter.

4. In a signal device, in combination, an impulse accentuator and an interval determinant each involving driving means therefor operable from a source of fluid pressure, a biased retarded valve operable for controlling said determinant and means rendered effective incident to actuation of said accentuator for causing movement of said valve in opposition to the bias thereof.

5. In a signal device, in combination, an impulse accentuator and an interval determinant each involving driving means therefor operable from a source of fluid pressure, a biased, retarded, controlling valve for said determinant, operable in opposition to the bias thereof when subjected to a predetermined fluid condition, and means rendered effective incident to actuation of said accentuator for causing the establishment of said predetermined fluid condition.

6. In a signal device, in combination, an impulse accentuator and an interval determinant each involving driving means therefor operable from a source of fluid pressure, and fluid controlling means comprising electromagnetically controlled valve mechanism for so governing the fluid conditions of the driving means of said accentuator and of said determinant as to effect functional interdependence therebetween.

7. In a signal device, in combination, an impulse accentuator and an interval determinant each involving fluid pressure operable means for causing functional actuation thereof when subjected to certain fluid conditions, a retarded, fluid pressure operable valve for controlling the actuation of said determinant, and an electromagnetically controlled valve for so governing the actuation of said accentuator and the operation of said retarded valve as to effect functional interdependence between said accentuator and said determinant.

8. In a signal device, in combination, an impulse accentuator involving a fluid pressure operable actuator therefor, an interval determinant involving a fluid pressure operable driving motor therefor, a retarded fluid pressure operable valve for governing said motor, and an electromagnetically controlled valve for so governing said actuator and said retarded valve as to effect functional interdependence between said accentuator and said determinant.

9. In a signal device, in combination, an impulse accentuator and an interval determinant each involving fluid pressure operable means for causing functional actuation thereof, a retarded valve operable incident to the operation of said accentuator for causing action of said determinant, and an electromagnetically controlled valve for governing the action of said accentuator.

10. In a signal device, in combination, an impulse accentuator involving a fluid pressure operable actuator therefor, an interval determinant involving a fluid pressure operable driving motor therefor, a biased valve for controlling said motor, said valve having a plurality of passages and being operable in opposition to the bias thereof incident to escape of fluid from a certain one of said passages, and an electromagnetically controlled valve for concurrently governing the operation of said actuator and the escape of fluid from said one of said valve passages.

11. In a signal device, in combination, an impulse accentuator involving a fluid pressure operable actuator therefor, an interval determinant involving a fluid pressure operable driving motor therefor, a biased valve for controlling said motor, said valve having a plurality of passages and being operable in opposition to the bias thereof incident to escape of fluid from a certain one of said passages, and an electromagnetically controlled valve for concurrently governing the supply of fluid for the operation of said actuator and the escape of fluid from said one of said valve passages.

12. In a signal device, in combination, an impulse accentuator and an interval determinant each involving driving means therefor operable from a source of fluid pressure, a connection for such a source, means including an electromagnetically governed valve, which valve has a normal and an abnormal position, for establishing fluid communication between said connection and the driving means of both said accentuator and said determinant upon abnormal positioning of said valve and for terminating such communication with said driving means following normal positioning of said valve, and involving means for suitably delaying termination of the effectiveness of such fluid connection with the driving means for said determinant and for instantly effecting such termination as to the driving means for said accentuator.

13. In a signal device, in combination, an impulse accentuator and an interval determinant each involving driving means therefor operable from a source of fluid pressure, a connection for such a source, means for governing the operation of said determinant, which means includes a valve for governing fluid communication between said connection and the driving means of said determinant, a fluid measuring device, means for restricting flow of fluid into said measuring device, means for operating said valve upon accumulation of a predetermined amount of fluid in said measuring device, and a controlling valve for said accentuator involving means for permitting escape of the measured fluid.

14. In a signal device, an impulse accentuator involving a fluid pressure operable actuator therefor, an interval determinant involving a fluid pressure operable driving motor therefor and retarded valve mechanism operable by fluid pressure for controlling the supply of fluid to said motor, a supply conduit suited for connection with a source of fluid pressure, a valve having a plurality of passages, one of which is connected with said conduit, said valve operable in response to a suitable source of signaling impulses to govern fluid connection between said passages, conduits connected to other of said valve passages for the control of the operating fluid supply of said actuator and for the control of said valve mechanism, and conduits, including said first named conduit, for conducting operative fluid to said motor subject to control of the flow thereof by said valve mechanism.

15. In a fluid pressure operable signal device,—an impulse accentuator and an interval determinant, in combination with valve mechanism constructed and arranged for instantly and concurrently changing the fluid condition of said accentuator and said determinant from normal to abnormal and for changing the fluid condition of said determinant from abnormal to normal only following a predetermined period throughout which the fluid condition of said accentuator remains normal a predetermined interval.

16. In a fluid pressure operable signal device,—an impulse accentuator and an interval determinant, in combination with valve mechanism constructed and arranged for instantly and concurrently changing the fluid condition of said accentuator and said determinant from normal to abnormal, and for changing the fluid condition of said determinant from abnormal to normal only after the expiration of a period throughout which the fluid condition of said accentuator is normally conditioned and which period is longer than the longest interval between the impulses of any signal.

17. In a fluid pressure operable signal device,—an impulse accentuator and an interval determinant, in combination with an electromagnet and valve mechanism constructed and arranged to be so controlled by said electromagnet that, when the condition of said magnet is changed from normal to abnormal or from abnormal to normal, the fluid condition of said accentuator will be correspondingly altered, and so that each change in the condition of said magnet from normal to abnormal will cause said mechanism to so act that the fluid condition of said determinant will thereafter be maintained in abnormal condition for a time longer than the longest interval between the impulses of any signal.

18. In a fluid pressure operable signal device,—an impulse accentuator and an interval determinant, in combination with a controlling valve for said determinant comprising a barrel containing a plunger and having provision for restricted flow of fluid from end to end thereof, a compression chamber arranged for fluid communication with an end of said barrel, and means for controlling the fluid conditions of said accentuator and said chamber.

19. In a fluid pressure operable signal device,—an impulse accentuator and an interval determinant, in combination with a controlling valve for said determinant comprising a barrel containing a plunger and having provision for restricted flow of fluid from end to end thereof, a compression chamber, and suitably operable means for governing fluid communication with said accentuator and between said valve, said chamber and an escape orifice.

20. In a fluid pressure operable signal device:—an impulse accentuator and an interval determinant; in combination with a barrel and a plunger movable therein for controlling the fluid pressure supply for said determinant, the relative construction and arrangement of said barrel and plunger being such as to provide for restricted flow of fluid from end to end thereof, a compression chamber, and suitably operable means for governing the fluid condition of said accentuator and of said chamber.

21. In a fluid pressure operable signal device:—an impulse accentuator and an interval determinant; in combination with a barrel and a plunger movable therein for controlling fluid communication between said barrel and said determinant, the relative construction and arrangement of said barrel and plunger being such as to provide for restricted flow of fluid from end to end thereof; a compression chamber; and suitably operable means for alternately permitting the escape of fluid from said chamber and from said accentuator.

22. In a fluid pressure operable signal device:—an impulse accentuator and an interval determinant; in combination with a barrel and a plunger movable therein for controlling fluid communication between said barrel and said determinant, the relative construction and arrangement of said barrel and plunger being such as to provide for restricted flow of fluid from end to end thereof; a compression chamber; and suitably operable means for alternately permitting the escape of fluid from said chamber and said accentuator, and for establishing communication between said accentuator and a connection for a source of fluid pressure supply whenever said means is conditioned for permitting the escape of fluid from said chamber.

23. In a fluid pressure operable signal device:—an impulse accentuator and an interval determinant; in combination with a barrel and a plunger movable therein for controlling the fluid pressure supply for said determinant, the relative construction and arrangement of said barrel and plunger being such as to provide for restricted flow of fluid from end to end thereof; a compression chamber; and suitably operable means for concurrently opening an exhaust port for said chamber and a fluid supply port for said accentuator, and for opening an escape orifice from said accentuator when said ports are closed.

24. In a fluid pressure operable signal device;—an impulse accentuator, an interval determinant, a connection for a source of fluid pressure supply, an electromagnetically operable valve movable in one direction for causing said supply source to be placed in communication with said accentuator and said determinant and movable in the opposite direction for terminating such communication, and means comprising a restricted passage for suitably delaying the effectiveness of the second named movement of said valve in terminating communication between said supply connection and said determinant.

25. In a fluid pressure operable signal device:—an impulse accentuator, an interval determinant, a connection for a source of fluid pressure supply, an electromagnetically operable valve movable in one direction for causing said supply connection to be placed in communication with said accentuator and said determinant and movable in the opposite direction for terminating such communication, and means comprising a restricted passage and a storage chamber for suitably delaying the effectiveness of the second named movement of said valve in terminating communication between said supply connection and said determinant.

26. In a fluid pressure operable signal device:—an impulse accentuator, an interval determinant, a connection for a source of fluid pressure supply, and an electromagnetically operable valve movable in one direction for causing said supply connection to be placed in communication with said accentuator and said determinant, and movable in the opposite direction for terminating such communication; in combination with means comprising a restricted passage and a storage chamber for suitably delaying the effectiveness of the second named movement of said valve in terminating communication between said supply connection and said determinant for a period longer than the longest interval between actuations of said valve incident to any signal.

27. In a signal device, an impulse accentuator involving a fluid pressure operable actuator therefor and an electromagnetically controlled balanced valve for governing the supply of operating fluid thereto, an interval determinant involving a fluid pressure operable driving motor therefor and retarded valve mechanism for governing the supply of operating fluid thereto, said valve mechanism operable in one direction by fluid pressure and urged in the other direction by a force other than fluid pressure, and means operable incident to actuation of said accentuator for causing such change in the fluid condition within said valve mechanism as will effect operation of same in said first named direction.

28. Signal impulse accentuator mechanism comprising,—a piston and a cylinder therefor, an accentuator operable by movement of said piston in one direction, a spring urging said piston in the opposite direction, a connection to said cylinder for supplying fluid pressure for moving said piston against the urging of said spring, a suitably operable balanced valve for opening and closing said connection; in combination with a fluid pressure operable interval determinant, and means associated with said valve for establishing communication between said determinant and a source of fluid pressure supply and thereafter maintaining such communication until said valve has remained closed for a time longer than the longest interval between the impulses of any signal.

29. Signal impulse accentuator mechanism comprising,—an accentuator, a piston for actuating said accentuator during movement thereof in one direction, means constantly urging movement of said piston in the opposite direction, a cylinder for said piston, a connection for a source of fluid supply, an electromagnetically controlled balanced valve so connected and arranged that when said valve is normally positioned the end of said cylinder toward which said piston is normally urged will be in communication with an escape orifice and so that when said valve is abnormally positioned such cylinder end will be in communication with said supply connection; in combination with an interval determinant comprising a fluid pressure operable motor, a retarded valve for controlling the fluid supply for said motor, and means associated with said balanced valve for causing the actuation of said retarded valve.

30. Signal impulse accentuator mechanism comprising,—an accentuator, a piston for actuating said accentuator during movement thereof in one direction, means constantly urging movement of said piston in the opposite direction, a cylinder for said piston, a connection for a source of fluid supply, an electromagnetically controlled balanced valve so connected and arranged that when said valve is normally positioned the end of said cylinder toward which said piston is normally urged will be in communication with an escape orifice and so that when said valve is abnormally positioned such cylinder end will be in communication with said supply connection; in combination with a fluid pressure operable interval determinant, a biased valve for controlling the fluid supply for said determinant, and means associated with said balanced valve for causing said biased valve to be conditioned by abnormal positioning of said balanced valve to cause positioning of said biased valve for communicating fluid pressure to said determinant for a period thereafter longer than the longest interval between the impulses of any signal throughout which period said balanced valve is normally positioned.

31. Signal impulse accentuator mechanism comprising,—an accentuator, a piston for actuating said accentuator during movement thereof in one direction, means constantly urging movement of said piston in the opposite direction, a cylinder for said piston, a connection for a source of fluid supply, an electromagnetically controlled balanced valve so connected and arranged that when said valve is normally positioned the end of said cylinder toward which said piston is normally urged will be in communication with an escape orifice and so that when said valve is abnormally positioned such cylinder end will be in communication with said supply connection; in combination with a fluid pressure operable interval determinant, a biased valve controlling a connection between said determinant and said supply connection, and means associated with said valves whereby abnormal positioning of said balanced valve will cause abnormal positioning of said biased valve and so that when said balanced valve moves from abnormal to normal position said biased valve will thereafter be maintained in its abnormal position for a period longer than the longest interval between the impulses of any signal.

32. Fluid pressure operable signal impulse accentuator and interval determinant means and a connection for a source of fluid pressure supply, in combination with an electromagnet and valve mechanism arranged for such response thereto that when the condition of said magnet is changed from normal to abnormal said mechanism will act to effectively connect said supply source with both of said means and so that when the condition of said magnet is changed from abnormal to normal said mechanism will immediately act to interrupt the effectiveness of such connection with said accentuator means and will thereafter act to interrupt the effectiveness of such connection with said determinant means only after said magnet has been continuously normally conditioned for a predetermined interval.

33. In a fluid pressure operable signal device:—an impulse accentuator, an interval determinant, and a connection for a source of fluid pressure supply therefor;—in combination with a fluid receptacle, a valve permitting restricted flow of fluid from said supply connection to said receptacle and adapted when in one position to permit the flow of fluid from said supply connection to said determinant and to arrest such flow when in another position, said valve being so constructed and arranged that flow of fluid through said valve toward said receptacle will serve to move said valve so as to permit flow of fluid to said determinant and so that a predetermined change in the fluid condition of said receptacle will so condition said valve as to cause closure thereby of communication from said supply connection to said determinant; and suitably operable means for controlling the flow of fluid from said supply connection to said accentuator and for permitting the escape of fluid from said receptacle.

34. In a fluid pressure operable signal device:—an impulse accentuator and a suitably operable controlling valve therefor, in combination with a fluid pressure operable interval determinant and controlling means for said determinant comprising,—a plunger; a barrel lengthwise of which said plunger may freely travel, said barrel being so fitted to said plunger as to permit suitably restricted fluid flow from end to end thereof; a port in said barrel connecting with said determinant and closable by movement of said plunger; a spring urging said plunger for movement to close said port; a second port in said barrel arranged for connection with a source of fluid supply and positioned and arranged for applying fluid pressure to one end of said plunger for movement thereof to open said first named port and for unrestrictedly supplying fluid pressure to said first named port when open; a compression chamber; a third port in said barrel arranged for fluid communication with said chamber and with an escape orifice controlled by said valve, said third port being positioned beyond the other end of said plunger.

35. In a signal recorder; paper tape propelling and marking mechanism, in combination with a fluid pressure operable motor for driving said propelling mechanism, a biased valve for controlling the supply of fluid to said motor, a fluid pressure operable actuator for said marking mechanism, and an electromagnetically operable valve for controlling the escape of fluid from one side of said biased valve and for controlling the supply of fluid to said actuator.

36. In a signal recorder; paper tape propelling and marking mechanism, in combination with a fluid pressure operable motor for driving said propelling mechanism, a biased valve for controlling the supply of fluid to said motor, a fluid pressure operable actuator for said marking mechanism, and an electromagnetically operable valve for controlling the escape of fluid from one side of said biased valve and for controlling the escape of fluid from said actuator.

37. In a signal recorder; paper tape propelling and marking mechanism, in combination with a fluid pressure operable motor for driving said propelling mechanism, a biased valve for controlling the supply of fluid to said motor, a fluid pressure operable actuator for said marking mechanism, and an electromagnetically operable valve for controlling the escape of fluid from one side of said biased valve and for controlling fluid supply to and escape from said actuator.

38. In a signal recorder; paper tape propelling and electromagnetically controlled marking mechanism, in combination with a fluid pressure operable motor for driving said propelling mechanism; a connection for a source of fluid pressure supply; a valve movable in one direction by fluid pressure and constantly urged for movement in the other direction by a force other than fluid pressure; said valve being arranged for controlling the operating fluid supply for said motor; and means rendered effective incident to actuation of said marking mechanism for causing application of fluid pressure to move said valve in said first named direction.

39. In a signal recorder,—an electromagnet, a balanced valve controlled thereby, a connection for a source of fluid supply, a cylinder one end of which is so connected with said valve that when said valve is normally positioned such cylinder end will be in communication with an escape orifice and so that when said valve is abnormally positioned such end of said cylinder will be in communication with said supply connection, a piston in said cylinder, means constantly urging said piston toward such connected end of said cylinder, marking means operable by movement of said piston against the urging of said means, and fluid driven paper propelling mechanism so controlled by said valve as to be conditioned, by abnormal positioning of said valve, to operate for a period thereafter longer than the longest interval between the impulses of any signal.

40. In a signal recorder,—an electromagnet, a balanced valve controlled thereby, a connection for a source of fluid supply, a cylinder one end of which is so connected with said valve that when said valve is normally positioned such cylinder end will be in communication with an escape orifice and so that when said valve is abnormally positioned such end of said cylinder will be in communication with said supply connection, a piston in said cylinder, means constantly urging said piston toward such connected end of said cylinder, marking means operable by movement of said piston against the urging of said means, and paper propelling mechanism comprising a fluid pressure operable motor, a retarded valve for controlling the supply of fluid to said motor, and means associated with said balanced valve for causing the actuation of said retarded valve.

41. In a signal recorder,—an electromagnetically controlled balance valve, a connection for a source of fluid supply, a cylinder containing a piston movable in one direction by fluid pressure, a spring for moving said piston in the opposite direction, a marking device operable by movement of said piston in opposition to said spring, ports in said valve whereby movement thereof may place said cylinder in communication with either said supply connection or with an escape orifice, paper feeding means, a driving motor for said feeding means, controlling means for said motor comprising a barrel one end of which connects with said motor and with said supply connection and the other end of which connects with a timing cavity, a plunger in said barrel movable lengthwise thereof, said plunger being so formed as to close communication between said barrel and said motor when at one end of the travel therof and so as to at all times suitably restrict the passage of fluid between said supply connection and said cavity.

42. In a signal recorder:—a fluid pressure operable motor for propelling paper tape; controlling means for said motor comprising a plunger, a barrel lengthwise of which said plunger may freely travel, said barrel being so fitted to said plunger as to permit suitably restricted fluid flow around said plunger, a port in said barrel connecting with said motor for supplying driving fluid thereto and arranged to be closed by said plunger, a spring urging said plunger into closing relation with said port, a second port in said barrel arranged for connection with a source of fluid supply and positioned at such end of said plunger as to be adapted for applying fluid pressure for movement thereof to open said first named port and for unrestrictedly supplying fluid to said first named port when open, a compression chamber, a third port in said barrel arranged for fluid communication with said chamber and with an escape orifice, said third port being positioned beyond the other end of said plunger; and electromagnetically controlled marking mechanism comprising a cylinder, a piston therein, a marker operable by movement of said piston in one direction, and an electromagnetically operable balanced valve governing communication between said cylinder, an escape orifice and the second named port of said barrel and also governing the connection between the third port of said barrel and the escape orifice associated therewith.

In witness whereof, I hereunto subscribe my name, this 2nd day of July, 1921.

HARRY SMITH.